April 26, 1932.    G. H. BORG    1,855,279
ANTISKID DEVICE FOR TIRES
Filed Nov. 25, 1930
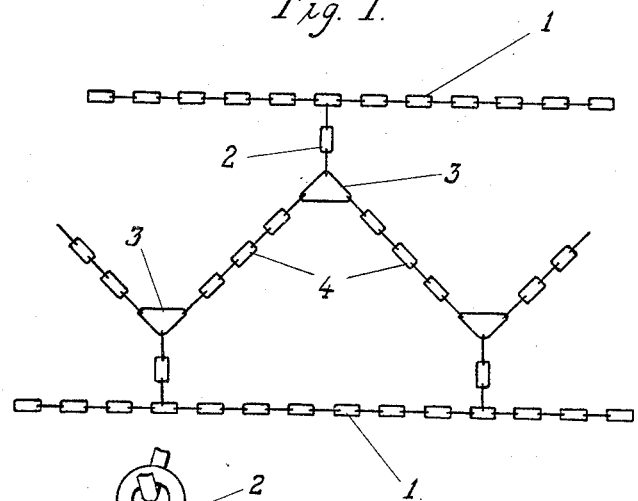
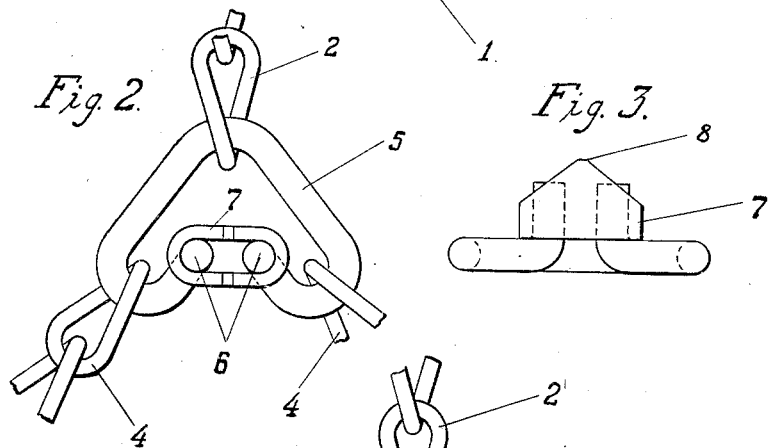
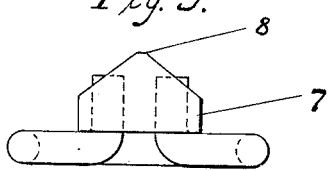
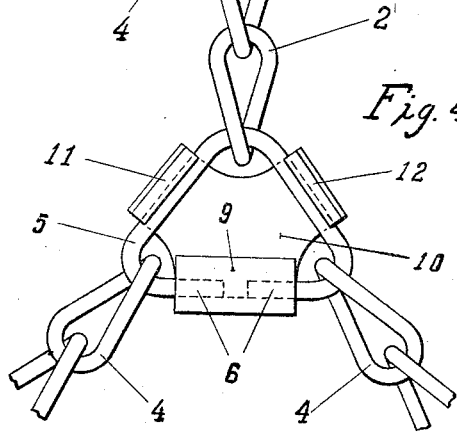
Inventor.
G. H. Borg
Atty Patented Apr. 26, 1932

1,855,279

UNITED STATES PATENT OFFICE

GUSTAF HENNING BORG, OF HALLINGSJO, SWEDEN

ANTISKID DEVICE FOR TIRES

Application filed November 25, 1930, Serial No. 498,132, and in Sweden November 28, 1929.

This invention relates to certain improvements in anti-skid devices for tires and it is an object of the invention to provide a novel and improved device of this general character comprising a plurality of anti-skid members, these members being arranged in two sets disposed at opposite sides of the transverse center of the tread of the tire. These anti-skid members are secured to the side chains by means of short chains and connected to each other by diagonally disposed chains. As the anti-skid members are provided with projecting parts which penetrate in the roadway skidding of the vehicle is avoided.

A further object of the invention is to enable the exchanging of damaged parts of the chain without the necessity to remove the whole anti-skid device, by means of an antiskid member, which consists of a metal wire bent in form of a loop from which the chain parts can be easily removed, means being provided to hold together the two ends of the metal wire and to avoid loosening of the chains.

Another object of the invention consists in the fact that no special means are provided to keep the chains in their position in the anti-skid member. This is made possible by the special form of the anti-skid member, which is bent in form of a triangle, so that the chains are kept in the corners of this triangle.

The invention consists in the details of construction and in the combination and arrangement of the several parts of my improved anti-skid device for tires, whereby certain important advantages are attained and the device is rendered simpler, less expensive and otherwise more convenient and advantageous for use.

The novel feature of my invention will hereinafter be definitely claimed.

In order that my invention may be the better understood, I will now proceed to describe the same with reference to the accompanying drawings wherein:—

Fig. 1 is a fragmentary view in plan illustrating an anti-skidding device constructed in accordance with an embodiment of my invention and unapplied.

Fig. 2 is a plan view of a connecting piece of the first form of construction.

Fig. 3 is a side view of Fig. 2.

Fig. 4 shows a plan view of the anti-skid member according to a second form of construction.

The anti-skidding device consists of a pair of side chains 1 which are adapted to be disposed circumferentially of the tire at opposite sides thereof in a convenient manner. A plurality of transverse chains 2 are secured to the said side chains 1, said chains 2 being alternately arranged and terminating short of the transverse center of the tread of the tire, when the device is applied thereto or of a length to terminate short of the transverse center between the side chains 1, when said side chains are at the limit of their separation.

Two sets of anti-skid members 3 are secured to the chains 2 and connected to each other by diagonally disposed chains 4, these members being so arranged that the sets assume a position to each side of the center of the tread of the tire when the device is applied thereto.

As disclosed in the accompanying drawings each of the anti-skid members consists of a metal wire 5 which is bent in form of a triangle, the ends 6 of this wire being bent inwardly and upwardly as shown in Fig. 2. Over these upwardly bent ends 6 a sleeve 7 is pushed whereby the ends of the metal wire are kept together. This sleeve projects over the horizontal plane of the metal loop and has the form of a triangle, the top 8 of which penetrates in the roadway and prevents skidding of the wheel.

If one of the connecting chains is damaged the sleeves of the corresponding anti-skid members are taken away and a new chain piece is set in. As the anti-skid member has the form of a triangle, the chains are held in position when fitted onto a tire.

The form of construction shown in Fig. 4 corresponds to the first form of construction. The metal wire 5 is bent also in form of a triangle, but the two ends of the wire are held together by means of a bent extension 9 of a metal plate 10 arranged below the metal wire. This metal plate is also cut out in form of a triangle and the two other extensions 11 and 12 are bent in a right angle so that the metal wire is held between these projecting parts 11 and 12 and the bent part 9. If a chain is damaged and has to be removed the metal wire is taken away from the plate 10. The plate 10 is of such a form that the links of the chains have sufficient place as indicated in Fig. 4.

I claim:—

1. An anti-skid chain comprising in combination a pair of side chains circumferentially arranged around a tire, a plurality of split triangular shape connecting links, detachable chains engaging the angular corners of the connecting links and the side chains, and a locking member engaging the free ends of each connecting link, each locking member having an extended portion projecting beyond the horizontal plane of the connecting links to coact with the chains and links to prevent skidding.

2. An anti-skid chain comprising in combination a pair of side chains circumferentially arranged around a tire, a plurality of split triangular shape connecting links, three detachable chains angularly disposed upon each link, said detachable chains connected to adjacent links and side chains respectively, a locking member formed with two projections and a curved extension, the split ends of the connecting link engaging in the curved extension and the two projections engaging over and extending beyond the side bars of the connecting link.

3. A connection for anti-skid chains comprising in combination a triangular split link, the corners of which receive connecting chains, and a substantially triangular shape locking member having an extension to overlap and engage the split ends of the link to prevent said ends spreading, said locking element also having two end projections engaging the bars of the links and extending beyond the same to form anti-skidding devices.

In testimony whereof I affix my signature.

GUSTAF HENNING BORG.